(12) United States Patent
Yamamoto et al.

(10) Patent No.: US 7,553,960 B2
(45) Date of Patent: *Jun. 30, 2009

(54) PHTHALOCYANINE COMPOUND

(75) Inventors: Seiichi Yamamoto, Kanagawa (JP);
Masahiko Taniguchi, Kanagawa (JP);
Yasuhiro Yoshioka, Kanagawa (JP);
Takanori Hioki, Kanagawa (JP); Hideo Hanawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 582 days.

This patent is subject to a terminal disclaimer.

(21) Appl. No.: 11/228,305

(22) Filed: Sep. 19, 2005

(65) Prior Publication Data
US 2006/0252927 A1 Nov. 9, 2006

Related U.S. Application Data

(63) Continuation-in-part of application No. 11/072,513, filed on Mar. 7, 2005, now Pat. No. 7,157,220.

(30) Foreign Application Priority Data

| Mar. 23, 2004 | (JP) | .............................. | 2004-085655 |
| Aug. 24, 2004 | (JP) | .............................. | 2004-244080 |
| Oct. 29, 2004 | (JP) | .............................. | 2004-315901 |
| Feb. 1, 2005 | (JP) | .............................. | 2005-025698 |
| Mar. 22, 2005 | (JP) | .............................. | 2005-082773 |

(51) Int. Cl.
*C09B 47/04* (2006.01)

(52) U.S. Cl. .................................................... 540/122

(58) Field of Classification Search .................. 540/122
See application file for complete search history.

(56) References Cited

U.S. PATENT DOCUMENTS

| 5,468,599 | A | 11/1995 | Biavasco et al. | |
| 6,727,057 | B2 | 4/2004 | Suzuki et al. | |
| 7,157,220 | B2 * | 1/2007 | Yamamoto et al. | .......... 430/618 |
| 2003/0198907 | A1 | 10/2003 | Suzuki et al. | |
| 2004/0126717 | A1 | 7/2004 | Nakagawa et al. | |
| 2004/0234909 | A1 | 11/2004 | Inoue et al. | |

FOREIGN PATENT DOCUMENTS

| EP | 0001451 | * | 4/1979 |
| EP | 0 969 313 A | | 1/2000 |
| GB | 988615 | * | 4/1965 |
| GB | 1 226 562 A | | 3/1971 |

* cited by examiner

*Primary Examiner*—James O Wilson
*Assistant Examiner*—Brian McDowell
(74) *Attorney, Agent, or Firm*—Margaret A. Burke; Sheldon J. Moss

(57) ABSTRACT

The present invention provides a phthalocyanine compound represented by the following formula (PC-1):

Formula (PC-1)

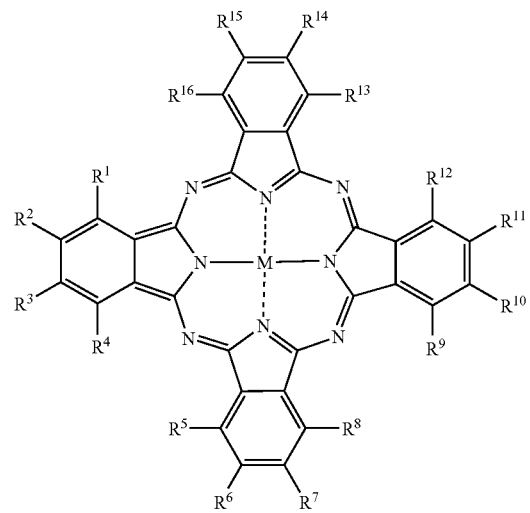

(wherein M represents a hydrogen atom or a metal atom, $R^1$, $R^4$, $R^5$, $R^8$, $R^9$, $R^{12}$, $R^{13}$, and $R^{16}$ each represents independently a hydrogen atom or a substituent, at least one of $R^1$, $R^4$, $R^5$, $R^8$, $R^9$, $R^{12}$, $R^{13}$, and $R^{16}$ is a group represented by formula (II), and $R^2$, $R^3$, $R^6$, $R^7$, $R^{10}$, $R^{11}$, $R^{14}$, and $R^{15}$ each independently represent a hydrogen atom or a substituent);

—$SO_2R^{17}$   Formula (II)

(wherein $R^{17}$ represents an alkyl group, aryl group or a heterocyclic group having a hydrophilic group). A novel phthalocyanine compound having high durability and useful as a functional dye is provided.

17 Claims, No Drawings

PHTHALOCYANINE COMPOUND

CROSS-REFERENCE TO RELATED APPLICATION

This application claims priority under 35 USC 119 from Japanese Patent Application Nos. 2004-085655, 2004-244080, 2004-315901, 2005-025698, and 2005-082773, the disclosures of which are incorporated by reference herein. This application is a continuation-in-part of U.S. application Ser. No. 11/072,513, filed Mar. 7, 2005 now U.S. Pat. No. 7,157,220 the disclosure of which is incorporated by reference herein.

BACKGROUND OF THE INVENTION

1. Field of the Invention

The present invention relates to a phthalocyanine compound having high durability and useful as a functional dye.

2. Description of the Related Art

Phthalocyanine compounds are widely used not only as dyes or pigments having high durability, but also as functional dyes. In particular, Japanese Patent Application Laid-Open (JP-A) No. 2003-94828 and the like disclose the use of a phthalocyanine compound, which is substituted by an alkyl group, an aryl group, or a heterocyclic sulfonyl group at α position, as a dye in a recording layer of an optical information recording material such as a CD-R or the like. All of the patents, patent publications, and non-patent literature cited in the specification are expressly incorporated by reference herein. Phthalocyanine compounds having a sulfonyl group as a substituent at α position have preferable absorption characteristics; however all of the well-known compounds are oil-soluble, and the use and using methods thereof are limited. In addition, a water-soluble phthalocyanine compound having a sulfonyl group as a substituent at β position is disclosed in JP-A No. 2004-323511, but an aqueous solution thereof shows only a broad spectral light absorption spectrum derived from its aggregates.

SUMMARY OF THE INVENTION

A first aspect of the invention is to provide a phthalocyanine compound represented by the following formula (PC-1):

Formula (PC-1)

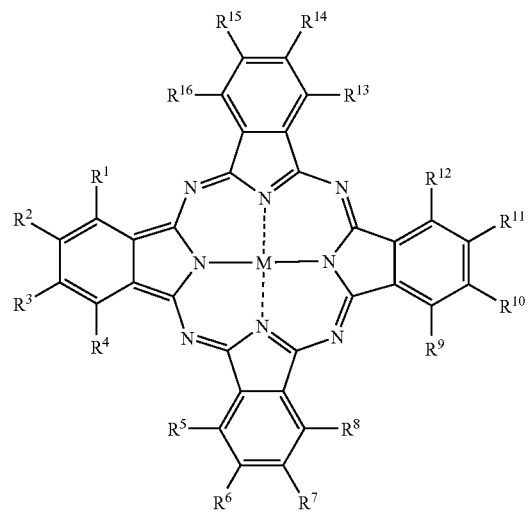

wherein, M represents a hydrogen atom or a metal atom. $R^1$, $R^4$, $R^5$, $R^8$, $R^9$, $R^{12}$, $R^{13}$, and $R^{16}$ each independently represent a hydrogen atom or a substituent, and at least one of $R^1$, $R^4$, $R^5$, $R^8$, $R^9$, $R^{12}$, $R^{13}$, and $R^{16}$ is a group represented by formula (II). $R^2$, $R^3$, $R^6$, $R^7$, $R^{10}$, $R^{11}$, $R^{14}$, and $R^{15}$ each independently represent a hydrogen atom or a substituent.

$$-SO_2R^{17} \qquad \text{Formula (II)}$$

In formula (II), $R^{17}$ represents an alkyl group, an aryl group, or a heterocyclic group having a hydrophilic group.

A second aspect of the invention is to provide the following phthalocyanine compounds:

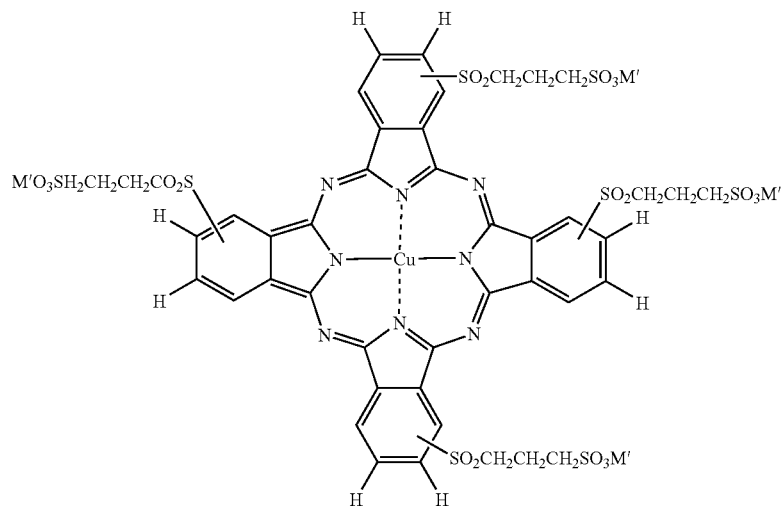

wherein, M' independently represents one selected from Li, Na, or NH$_4$;
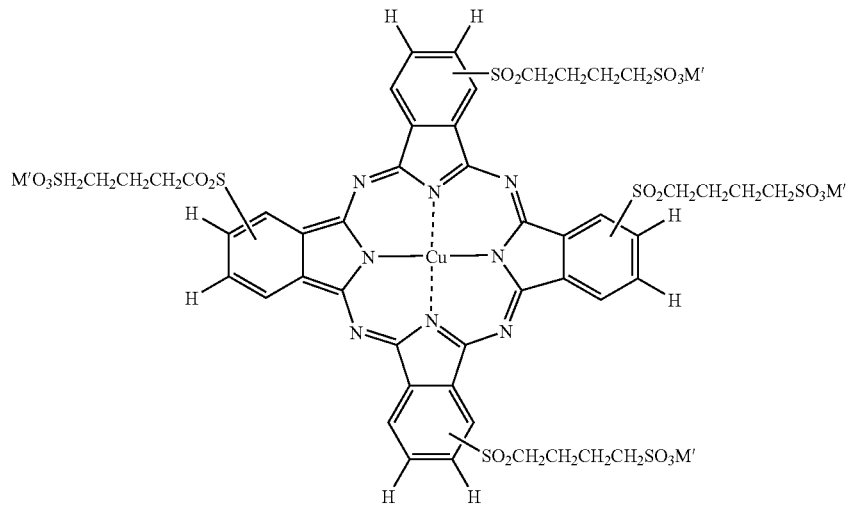
35
wherein, M' independently represents one selected from Li, Na, or NH$_4$;
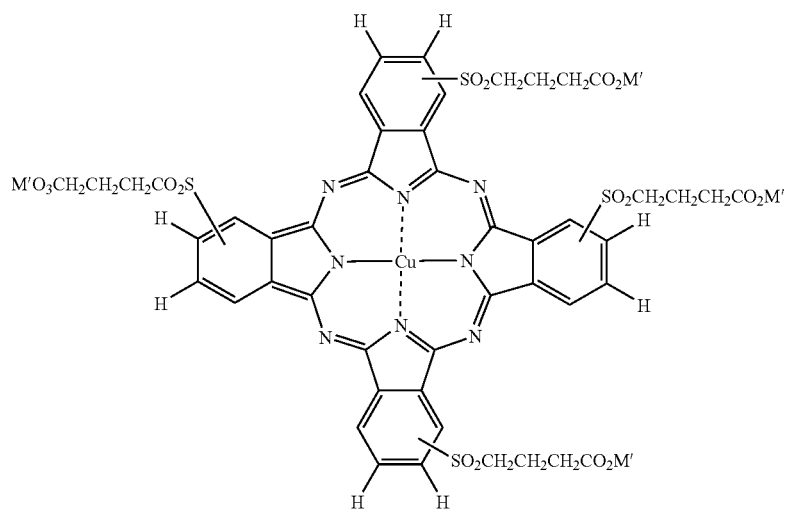

wherein, M' independently represents one selected from Li, Na, or NH$_4$;

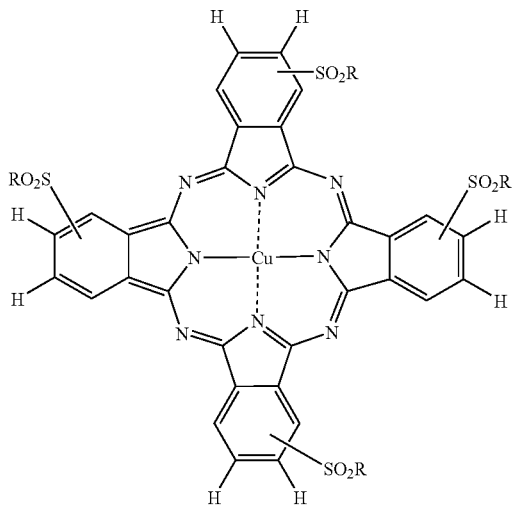

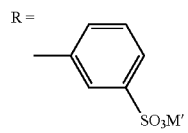

wherein, M' independently represents one selected from Li, Na, or NH$_4$;

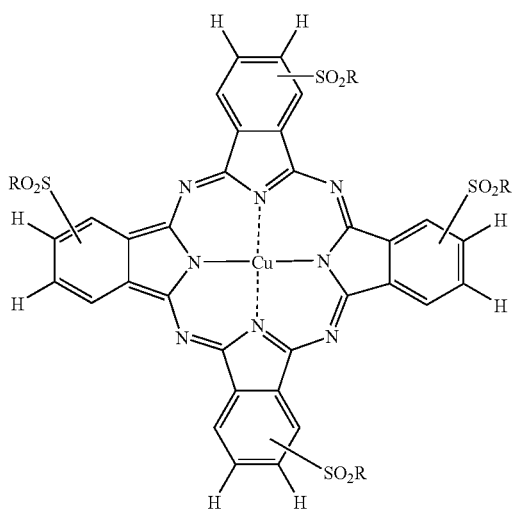

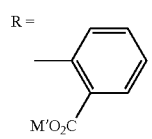

wherein, M' independently represents one selected from Li, Na, or NH$_4$;

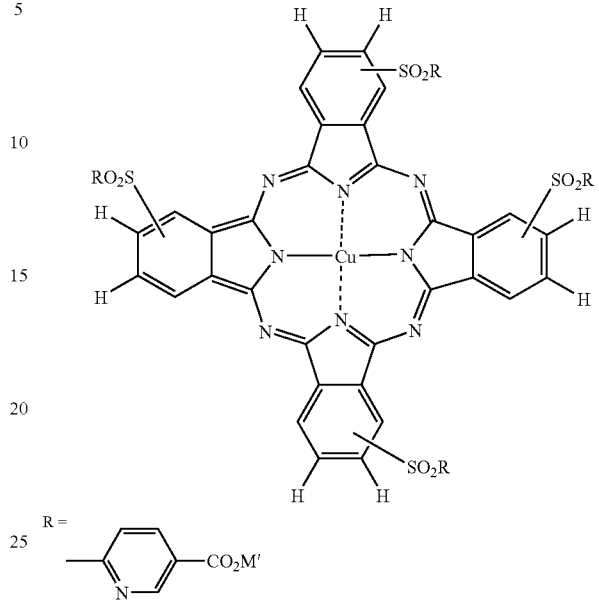

wherein, M' independently represents one selected from Li, Na, or NH$_4$.

DETAILED DESCRIPTION OF THE INVENTION

An object of the present invention is to provide a novel phthalocyanine compound having high durability and useful as a functional dye. Particularly, it is to provide a α-sulfonyl substituted phthalocyanine compound, which is water soluble, has a sharp spectral light absorption characteristic, and is useful as a functional dye.

The present invention is explained below in detail.

In the present invention, α position indicates 1, 4, 5, 8, 9, 12, 13, and 16 positions in the following formula, and β position indicates 2, 3, 6, 7, 10, 11, 14, and 15 positions.

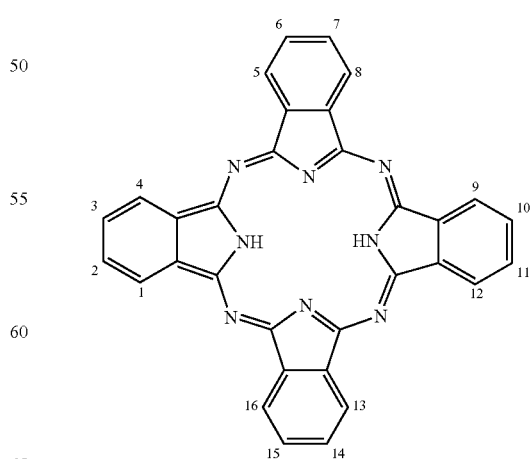

Phthalocyanine compounds of formula (PC-1) according to the present are described below.

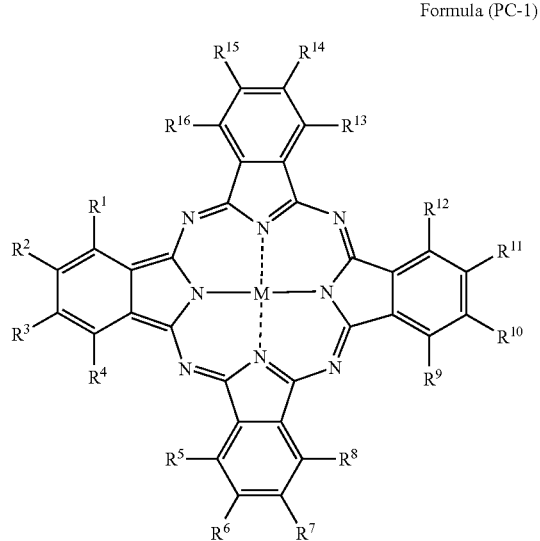

Formula (PC-1)

In formula (PC-1), M represents a hydrogen atom or a metal atom. A metal atom is preferred as M, and when M represents a metal atom, any metal which forms a stable complex may be employed. Li, Na, K, Be, Mg, Ca, Ba, Al, Si, Cd, Hg, Cr, Fe, Co, Ni, Cu, Zn, Ge, Pd, Sn, Pt, Pb, Sr, Mn, or the like can be used. Mg, Ca, Co, Zn, Pd, or Cu is preferably used, more preferably, Co, Pd, Zn, or Cu is used, and particularly preferably, Cu is used.

Further, when M is a hydrogen atom, formula (PC-1) is expressed as follows.

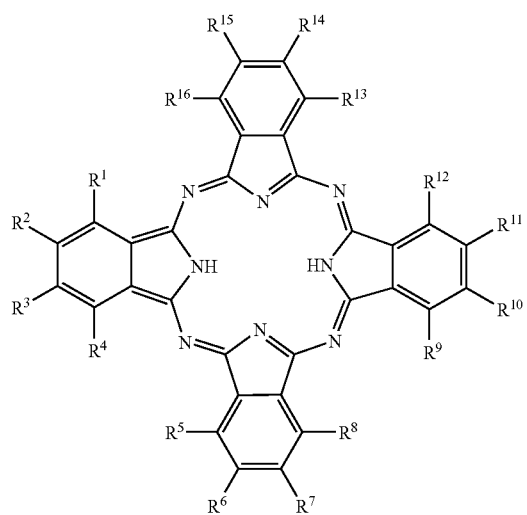

In formula (PC-1), $R^1$, $R^4$, $R^5$, $R^8$, $R^9$, $R^{12}$, $R^{13}$, and $R^{16}$ each independently represent a hydrogen atom or a substituent, and at least one of $R^1$, $R^4$, $R^5$, $R^8$, $R^9$, $R^{12}$, $R^{13}$, and $R^{16}$ is a group represented by formula (II):

—SO$_2$R$^{17}$      Formula (II)

wherein, $R^{17}$ represents an alkyl group, an aryl group, or a heterocyclic group containing a hydrophilic group.

The substituent other than the group represented by formula (II), which $R^1$, $R^4$, $R^5$, $R^8$, $R^9$, $R^{12}$, $R^{13}$, and $R^{16}$ can have, may be any substituent. Specific examples of the substituent include a halogen atom (a fluorine atom, a chlorine atom, a bromine atom, or an iodine atom), an alkyl group (including an aralkyl group, a cycloalkyl group, an active methine group, and the like), an alkenyl group, an alkynyl group, an aryl group, a heterocyclic group (at any substitution position), a heterocyclic group containing a quaternary nitrogen atom (for example, a pyridinio group, an imidazolio group, a quinolinio group, or an isoquinolinio group), an acyl group, an alkoxycarbonyl group, an aryloxycarbonyl group, a carbamoyl group, a carboxy group or a salt thereof, a sulfonylcarbamoyl group, an acylcarbamoyl group, a sulfamoylcarbamoyl group, a carbazoyl group, an oxalyl group, an oxamoyl group, a cyano group, a thiocarbamoyl group, a hydroxy group, an alkoxy group (including a group in which ethylene oxy group units or propylene oxy group units are repeated), an aryloxy group, a heterocyclic oxy group, an acyloxy group, an alkoxy carbonyloxy group, an aryloxy carbonyloxy group, a carbamoyloxy group, a sulfonyloxy group, an amino group, an alkylamino group, an arylamino group, a heterocyclic amino group, an acylamino group, a sulfonamide group, a ureido group, a thioureido group, an imide group, an alkoxycarbonylamino group, an aryloxycarbonylamino group, a sulfamoylamino group, a semicarbazide group, a thiosemicarbazide group, a hydrazino group, an ammonio group, an oxamoylamino group, an alkylsulfonylureido group, an arylsulfonylureido group, an acylureido group, an acylsulfamoylamino group, a nitro group, a mercapto group, an alkylthio group, an arylthio group, a heterocyclic thio group, an alkylsulfonyl group, an arylsulfonyl group, an alkylsulfinyl group, an arylsulfinyl group, a sulfo group or a salt thereof, a sulfamoyl group, an acylsulfamoyl group, a sulfonylsulfamoyl group or a salt thereof, a group containing a phosphoric amide structure or a phosphate ester structure, a silyloxy group (for example, trimethylsilyloxy, or t-butyldimethylsilyloxy), a silyl group (for example, trimethylsilyl, t-butyldimethylsilyl, or phenyldimethylsilyl), and the like. These substituents may be further substituted by these substituents.

The substituents are preferably a halogen atom, an alkyl group, an alkenyl group, an alkynyl group, an aryl group, a heterocyclic group (at any substitution position), a heterocyclic group containing a quaternary nitrogen atom (for example, a pyridinio group, an imidazolio group, a quinolinio group, or an isoquinolinio group), an acyl group, an alkoxycarbonyl group, an aryloxycarbonyl group, a carbamoyl group, a carboxy group or a salt thereof, a sulfonylcarbamoyl group, an acylcarbamoyl group, a sulfamoylcarbamoyl group, a carbazoyl group, an oxalyl group, an oxamoyl group, a cyano group, a thiocarbamoyl group, a sulfonyloxy group, an imide group, a sulfamoylamino group, a semicarbazide group, a thiosemicarbazide group, a nitro group, an alkylsulfonyl group, an arylsulfonyl group, an alkylsulfinyl group, an arylsulfinyl group, a sulfo group or a salt thereof, a sulfamoyl group, an acylsulfamoyl group, a sulfonylsulfamoyl group or a salt thereof, or a group containing a phosphoric amide structure or a phosphate ester structure.

More preferably, a halogen atom, an alkyl group, an aryl group, a heterocyclic group, an acyl group, an alkoxycarbonyl group, a carbamoyl group, a carboxy group or a salt thereof, an oxalyl group, an oxamoyl group, a cyano group, an imide group, a sulfamoylamino group, an alkylsulfonyl group, an arylsulfonyl group, an alkylsulfinyl group, an arylsulfinyl group, a sulfo group or a salt thereof, a sulfamoyl group, an acylsulfamoyl group, or a sulfonylsulfamoyl group or a salt thereof is used.

Even more preferably, an aryl group, a heterocyclic group, an acyl group, an alkoxycarbonyl group, a carbamoyl group, a carboxy group or a salt thereof, an alkylsulfonyl group, an arylsulfonyl group, an alkylsulfinyl group, an arylsulfinyl group, a sulfo group or a salt thereof, or a sulfamoyl group is used.

When $R^1$, $R^4$, $R^5$, $R^8$, $R^9$, $R^{12}$, $R^{13}$, and $R^{16}$ are a group represented by formula (II), it is preferred that 3 or more from among $R^1$, $R^4$, $R^5$, $R^8$, $R^9$, $R^{12}$, $R^{13}$, and $R^{16}$ are a group represented by formula (II), and more preferably, 4 of them are a group represented by formula (II).

More preferably, 4 of $R^1$ or $R^4$, $R^5$ or $R^8$, $R^9$ or $R^{12}$, and $R^{13}$ or $R^{16}$ are a group represented by formula (II). Particularly preferably, 4 of $R^1$ or $R^4$, $R^5$ or $R^8$, $R^9$ or $R^{12}$, and $R^3$ or $R^{16}$ are a group represented by formula (II) and the others are a hydrogen atom.

When a plural number of groups represented by formula (II) are present in a same molecule, these may be identical or different from each other, although it is preferable that they are identical.

In formula (II), $R^{17}$ represents an alkyl group, an aryl group, or a heterocyclic group, in which a hydrophilic group is contained. $R^{17}$ preferably represents an alkyl group or an aryl group, and particularly preferably an alkyl group. $R^{17}$ has 1 to 30 carbon atoms, preferably 1 to 20 carbon atoms, and more preferably 1 to 10 carbon atoms. More specifically, an alkyl group having 2 to 4 carbon atoms, a phenyl group, or a pyridyl group is preferably used as $R^{17}$, more preferably, an alkyl group having 3 or 4 carbon atoms or a phenyl group is used and, most preferably, an alkyl group having 3 carbon atoms is used.

Herein, the hydrophilic group indicates a carboxy group, a sulfo group, a phosphate group, a group having a structure of quaternary salt of nitrogen, a group having a structure of quaternary salt of phosphorus, or a group in which ethylene oxy group units are repeated. As the hydrophilic group, preferred are a carboxy group, a sulfo group, and a phosphate group, more preferred are a carboxy group and a sulfo group, and particularly preferred is a sulfo group.

In the case where the hydrophilic group is a carboxy group, a sulfo group, or a phosphate group, the hydrophilic group may have a counter cation. As the counter cation, a metal cation, an ammonium ion, a group having a structure of quaternary salt of nitrogen, or a group having a structure of a quaternary salt of phosphorus is used. Specifically, as a counter cation, $Li^+$, $Na^+$, $K^+$, $Mg^{2+}$, $Ca^{2+}$ or $NH_{4+}$ is preferably used, more preferably, $Li^+$, $Na^+$, or $NH_{4+}$ is used, and particularly preferably, $Li^+$ or $Na^+$ is used. A salt may be formed with one kind of the counter cation, or a mixture salt may be formed with plural kinds of the counter cation. In a case where the compound of the present invention has two or more counter cations in a molecule, the mixture salt is the mixture of every composition ratio of different counter cations and constitutes a specific composition ratio of counter cations as a whole.

In formula (PC-1), $R^2$, $R^3$, $R^6$, $R^7$, $R^{10}$, $R^{11}$, $R^{14}$, and $R^{15}$ each independently represent a hydrogen atom or a substituent. Herein, the substituent is selected from the same range as $R^1$, $R^4$, $R^5$, $R^8$, $R^9$, $R^{12}$, $R^{13}$, and $R^{16}$.

$R^2$, $R^3$, $R^6$, $R^7$, $R^{10}$, $R^{11}$, $R^{14}$, and $R^{15}$ are preferably a hydrogen atom, a halogen atom, a carboxy group, an alkoxycarbonyl group, an acyl group, a sulfo group, a sulfamoyl group, a sulfonyl group, an alkyl group, an aryl group, or a heterocyclic group.

More preferable are a hydrogen atom, a halogen atom, a sulfo group, a sulfamoyl group, and a sulfonyl group, particularly preferable are a hydrogen atom, a sulfo group, and a halogen atom, and most preferable is a hydrogen atom.

Among the compounds represented by formula (PC-1), a compound in which in each combination of $R^1$ and $R^4$, $R^5$ and $R^8$, $R^9$ and $R^{12}$, and $R^{13}$ and $R^{16}$, one is an alkylsulfonyl group including a sulfo group or a carboxy group, and the other is a hydrogen atom and $R^2$, $R^3$, $R^6$, $R^7$, $R^{10}$, $R^{11}$, $R^{14}$, and $R^{15}$ are hydrogen atoms is preferable. A compound in which in each combination of $R^1$ and $R^4$, $R^5$ and $R^8$, $R^9$ and $R^{12}$, and $R^{13}$ and $R^{16}$, one is an alkylsulfonyl group having 2 to 4 carbon atoms substituted by a sulfo group or a carboxy group, and the other is a hydrogen atom is more preferable. A compound in which in each combination of $R^1$ and $R^4$, $R^5$ and $R^8$, $R^9$ and $R^{12}$, and $R^{13}$ and $R^{16}$, one is an alkylsulfonyl group having 3 carbon atoms substituted by a sulfo group or a carboxy group, and the other is a hydrogen atom is even more preferable. A compound in which in each combination of $R^1$ and $R^4$, $R^5$ and $R^8$, $R^9$ and $R^{12}$, and $R^{13}$ and $R^{16}$, one is a 3-sulfoalkylsulfonyl group, and the other is a hydrogen atom is most preferable.

In general, phthalocyanine compounds having a plural number of substituents may have a regio isomer, in which the substituents have different bonding positions. The compounds represented by formula (PC-1) in the invention are not exceptional. In some cases several kinds of regio isomers may be present. In the invention, the phthalocyanine compound may be used as a single compound, but it may be used as a mixture of regio isomers. In the case where a mixture of regio isomers is used, any number of regio isomers, any substitution positons in the isomer, and any ratio of isomers may be employed.

It is preferred that the compound represented by formula (PC-1) is water-soluble. Solubility to water may be in any range as far as the aqueous solution of the compound can be used as a colored aqueous solution. The compound is preferably contained in an amount of 0.1% by weight or more at 25° C., more preferably 0.5% by weight or more, and particularly preferably 1% by weight or more.

Example of the compound represented by formula (PC-1) used in the present invention are shown below.

However, the present invention is not limited by these examples.

In the following examples of the compound, mixtures of regio isomers are described as a single compound.

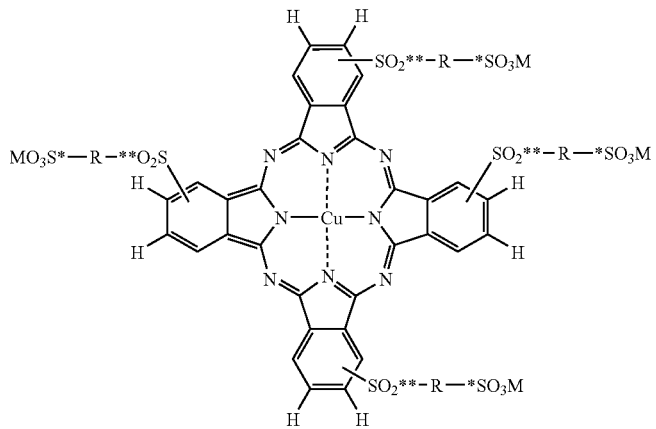
|  | Compound No. | | |
|---|---|---|---|
|  | M = Li | M = Na | M = K |
| **—R—* = **—CH$_2$CH$_2$—* | 1 | 10 | 19 |
| **—CH$_2$CH$_2$CH$_2$—* | 2 | 11 | 20 |
| **—CH$_2$CH$_2$CH$_2$CH$_2$—* | 3 | 12 | 21 |
| **—CH$_2$CH$_2$CH$_2$CH$_2$CH$_2$—* | 4 | 13 | 22 |
| **—CH$_2$CH$_2$—(OCH$_2$CH$_2$)n—* | | | |
| n = 1 | 5 | 14 | 23 |
| 2 | 6 | 15 | 24 |
| 3 | 7 | 16 | 25 |
| 4 | 8 | 17 | 26 |
| 5 | 9 | 18 | 27 |
|  | Compound No. | |
|---|---|---|
|  | M = Li | M = Na |
| **—C$_6$H$_4$—* (para) | 28 | 31 |
| **—C$_6$H$_4$—* (meta) | 29 | 32 |
| **—C$_6$H$_4$—* (ortho) | 30 | 33 |
| **—C$_6$H$_4$—CONHCH$_2$CH$_2$—* (para) | 34 | 37 |
| **—C$_6$H$_4$—CONHCH$_2$CH$_2$OCH$_2$CH$_2$—* (meta) | 35 | 38 |
| **—C$_6$H$_4$—CONHCH$_2$CH$_2$—* (ortho) | 36 | 39 |

-continued

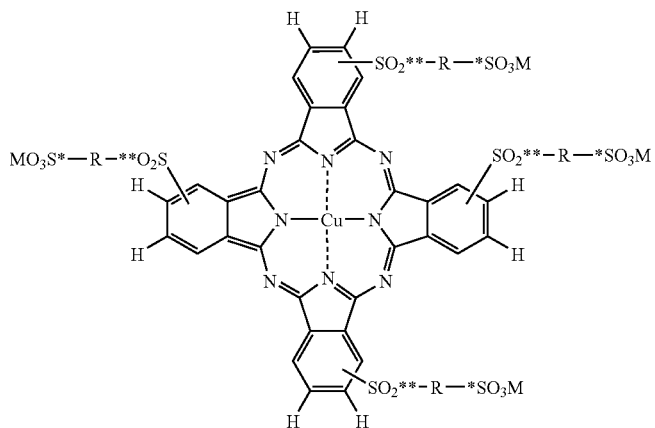

Compound No.

| **—R—* = | **—CH₂CH₂—* | 40 | M = Li & NH₄ (Li/NH₄ = 3/1) |
|---|---|---|---|
| | | 41 | M = Li & NH₄ (Li/NH₄ = 2/2) |
| | | 42 | M = Na & NH₄ (Na/NH₄ = 3/1) |
| | | 43 | M = Na & NH₄ (Na/NH₄ = 2/2) |
| | | 44 | M = Na & NH₄ (Na/NH₄ = 1/3) |
| | **—CH₂CH₂CH₂—* | 45 | M = Li & NH₄ (Li/NH₄ = 3/1) |
| | | 46 | M = Li & NH₄ (Li/NH₄ = 2/2) |
| | | 47 | M = Li & NH₄ (Li/NH₄ = 1/3) |
| | | 48 | M = Na & NH₄ (Na/NH₄ = 3/1) |
| | | 49 | M = Na & NH₄ (Na/NH₄ = 2/2) |
| | | 50 | M = Na & NH₄ (Na/NH₄ = 1/3) |
| | | 51 | M = K & NH₄ (K/NH₄ = 3/1) |
| | | 52 | M = K & NH₄ (K/NH₄ = 2/2) |
| | | 53 | M = K & NH₄ (K/NH₄ = 1/3) |
| | | 54 | M = Et₄N |
| | **—CH₂CH₂CH₂CH₂—* | 55 | M = Li & NH₄ (Li/NH₄ = 3/1) |
| | | 56 | M = Li & NH₄ (Li/NH₄ = 2/2) |
| | | 57 | M = Na & NH₄ (Na/NH₄ = 3/1) |
| | | 58 | M = Na & NH₄ (Na/NH₄ = 2/2) |
| | | 59 | M = Na & NH₄ (Na/NH₄ = 1/3) |

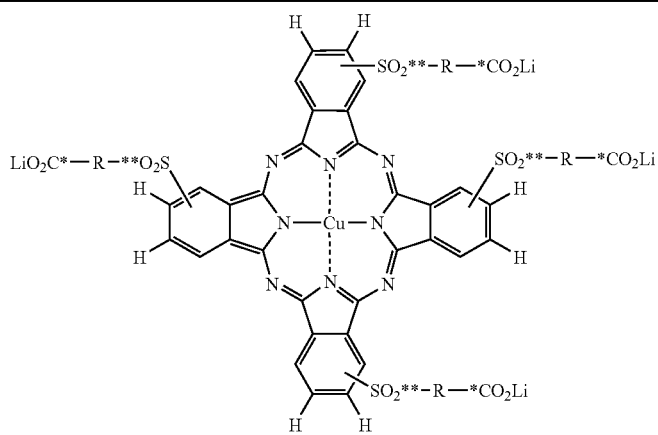

Compound No.

| **—R—* = | **—CH₂CH₂—* | 60 |
|---|---|---|
| | **—CH₂CH₂CH₂—* | 61 |
| | **—CH₂CH₂CH₂CH₂—* | 62 |
| | **—CH₂CH₂CH₂CH₂CH₂—* | 63 |
| | **—CH₂CH₂(OCH₂CH₂)n—* | 64 |
| | n = 1 | 65 |
| | 2 | 66 |
| | 3 | 67 |
| | 4 | 68 |
| | 5 | 69 |

-continued
| Compound No. | | Compound No. |
|---|---|---|
| 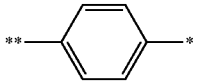 | 70 | 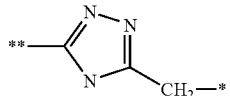 73 |
| 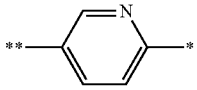 | 71 | 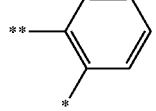 74 |
| 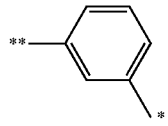 | 72 | 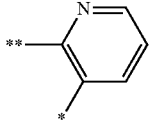 75 |
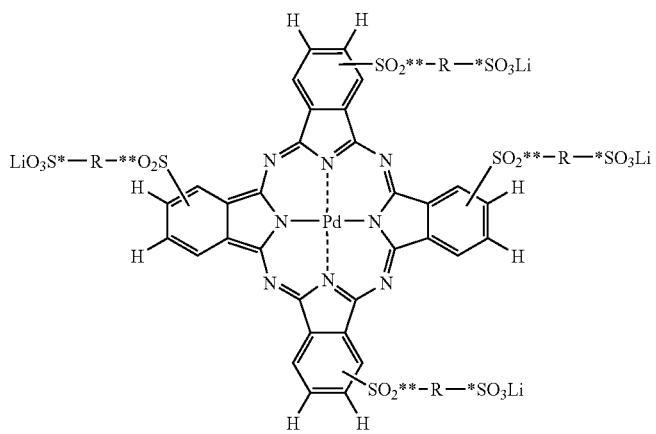
| | Compound No. |
|---|---|
| **—R—* = **—CH$_2$CH$_2$—* | 76 |
| **—CH$_2$CH$_2$CH$_2$—* | 77 |
| **—CH$_2$CH$_2$CH$_2$CH$_2$—* | 78 |
| **—CH$_2$CH$_2$CH$_2$CH$_2$CH$_2$—* | 79 |
| **—CH$_2$CH$_2$—(OCH$_2$CH$_2$)n—* | |
| n = 1 | 80 |
| 2 | 81 |
| 3 | 82 |
| 4 | 83 |
| 5 | 84 |
| | Compound No. |
|---|---|
| 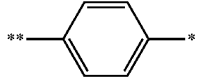 | 85 |
| 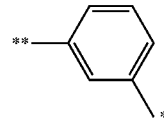 | 86 |
| 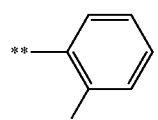 | 87 |

-continued
| | |
|---|---|
| 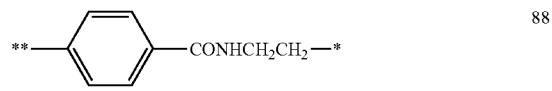 | 88 |
| 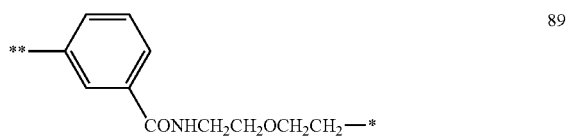 | 89 |
|  | 90 |
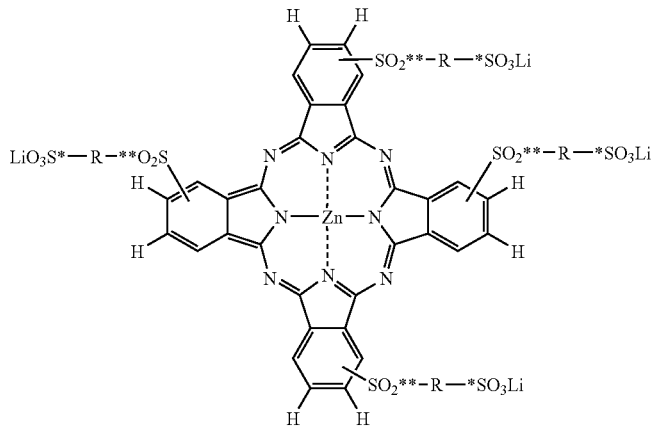
| | Compound No. |
|---|---|
| **—R—* = **—CH$_2$CH$_2$—* | 91 |
| **—CH$_2$CH$_2$CH$_2$—* | 92 |
| **—CH$_2$CH$_2$CH$_2$CH$_2$—* | 93 |
| **—CH$_2$CH$_2$CH$_2$CH$_2$CH$_2$—* | 94 |
| **—CH$_2$CH$_2$—(OCH$_2$CH$_2$)n—* | |
| n = 1 | 95 |
| 2 | 96 |
| 3 | 97 |
| 4 | 98 |
| 5 | 99 |
| | Compound No. |
|---|---|
|  | 100 |
|  | 101 |
|  | 102 |
| 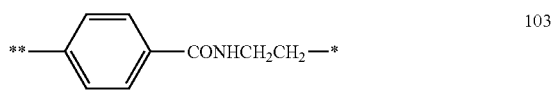 | 103 |

-continued
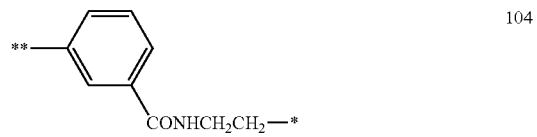
104
105
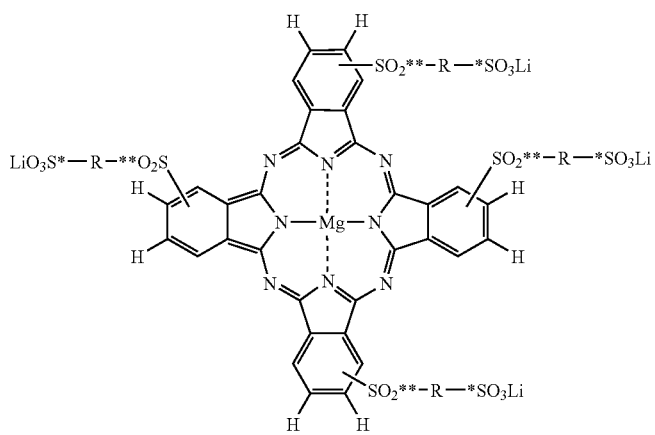
| | Compound No. |
|---|---|
| \*\*—R—\* = \*\*—CH$_2$CH$_2$—\* | 106 |
| \*\*—CH$_2$CH$_2$CH$_2$—\* | 107 |
| \*\*—CH$_2$CH$_2$CH$_2$CH$_2$—\* | 108 |
| \*\*—CH$_2$CH$_2$CH$_2$CH$_2$CH$_2$—\* | 109 |
| \*\*—CH$_2$CH$_2$—(OCH$_2$CH$_2$)n—\* | |
| n = 1 | 110 |
| 2 | 111 |
| 3 | 112 |
113
114
115

-continued
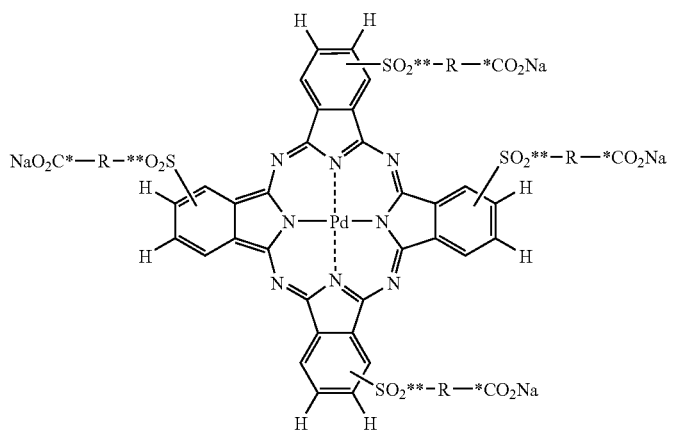
| | Compound No. |
|---|---|
| **—R—* = **—CH$_2$CH$_2$CH$_2$—* | 116 |
| **—CH$_2$CH$_2$CH$_2$CH$_2$—* | 117 |
| **—CH$_2$CH$_2$CH$_2$CH$_2$CH$_2$—* | 118 |
| **—CH$_2$CH$_2$—(OCH$_2$CH$_2$)n—* | |
| n = 1 | 119 |
| 2 | 120 |
| 3 | 121 |
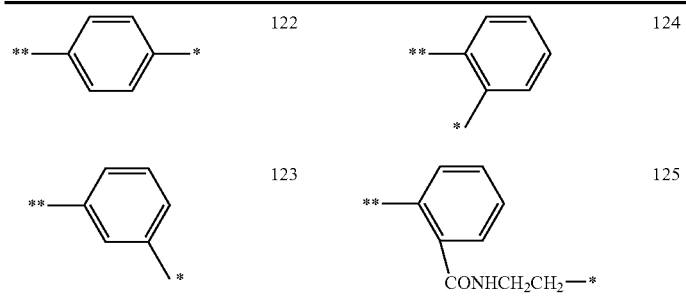
| Compound No. | | Compound No. |
|---|---|---|
| 122 | | 124 |
| 123 | | 125 |
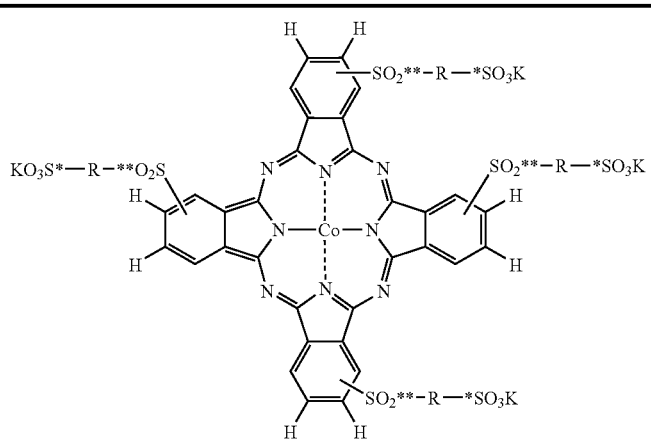
| | Compound No. |
|---|---|
| **—R—* = **—CH$_2$CH$_2$CH$_2$—* | 126 |
| **—CH$_2$CH$_2$CH$_2$CH$_2$—* | 127 |
| **—CH$_2$CH$_2$CH$_2$CH$_2$CH$_2$—* | 128 |
| **—CH$_2$CH$_2$—(OCH$_2$CH$_2$)n—* | |
| n = 1 | 129 |
| 2 | 130 |
| 3 | 131 |

-continued
| Compound No. | | Compound No. | |
|---|---|---|---|
| 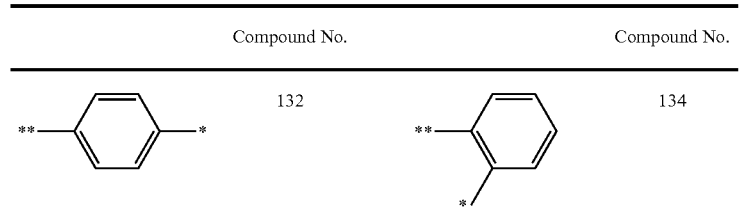 | 132 | | 134 |
| | 133 | | 135 |
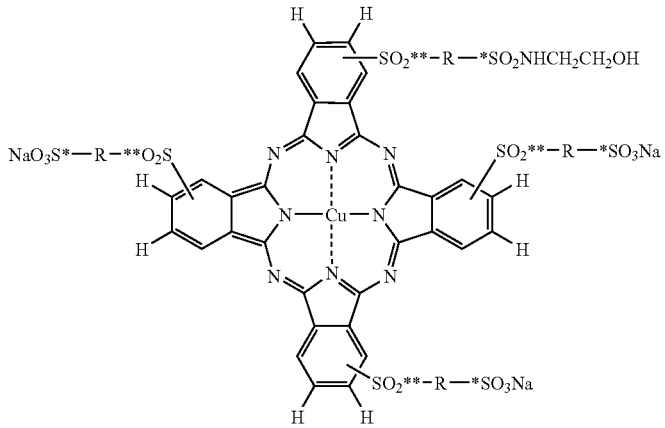
| | Compound No. |
|---|---|
| **—R—* = **—CH$_2$CH$_2$CH$_2$—* | 137 |
| **—CH$_2$CH$_2$CH$_2$CH$_2$—* | 138 |
| **—CH$_2$CH$_2$CH$_2$CH$_2$CH$_2$—* | 139 |
| **—CH$_2$CH$_2$—(OCH$_2$CH$_2$)n—* | |
| n = 1 | 140 |
| 2 | 141 |
| 3 | 142 |
| Compound No. | | Compound No. | |
|---|---|---|---|
| 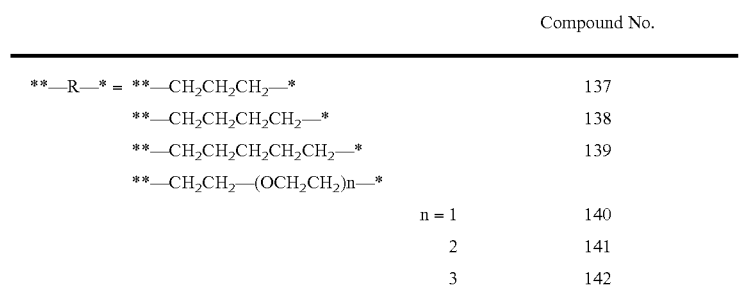 | 143 | | 145 |
| | 144 | 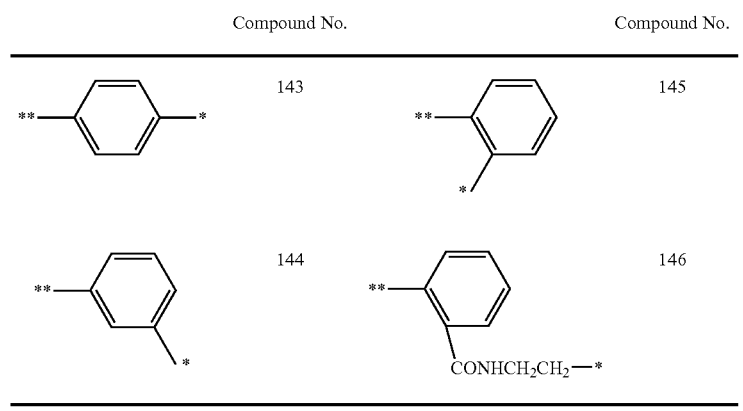 | 146 |

-continued
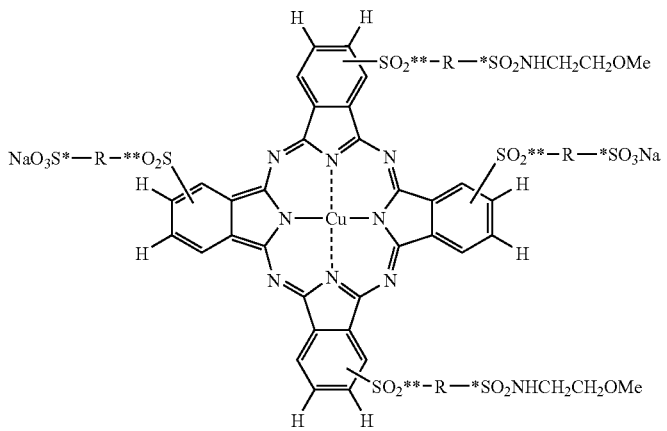
| | Compound No. |
|---|---|
| **—R—* = **—CH$_2$CH$_2$CH$_2$—* | 147 |
| **—CH$_2$CH$_2$CH$_2$CH$_2$—* | 148 |
| **—CH$_2$CH$_2$CH$_2$CH$_2$CH$_2$—* | 149 |
| **—CH$_2$CH$_2$—(OCH$_2$CH$_2$)n—* | |
| n = 1 | 150 |
| 2 | 151 |
| 3 | 152 |
| 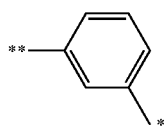 | 153 |
| 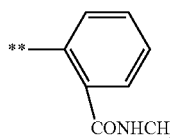 | 154 |
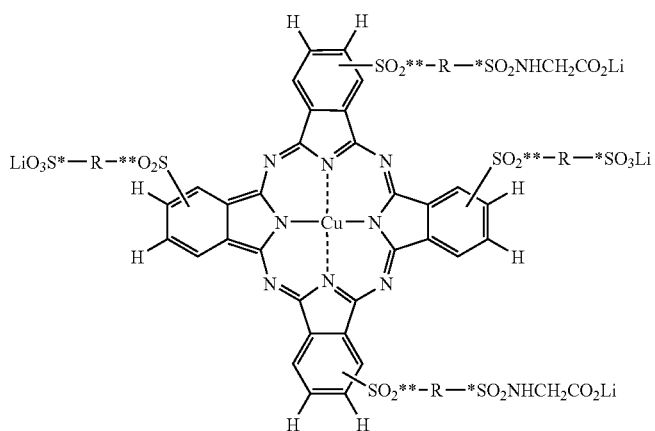
| | Compound No. |
|---|---|
| **—R—* = **—CH$_2$CH$_2$CH$_2$—* | 155 |
| **—CH$_2$CH$_2$CH$_2$CH$_2$—* | 156 |
| **—CH$_2$CH$_2$CH$_2$CH$_2$CH$_2$—* | 157 |
| **—CH$_2$CH$_2$—(OCH$_2$CH$_2$)n—* | |
| n = 1 | 158 |
| 2 | 159 |
| 3 | 160 |

-continued
| | |
|---|---|
| 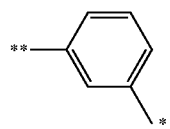 | 161 |
|  | 162 |
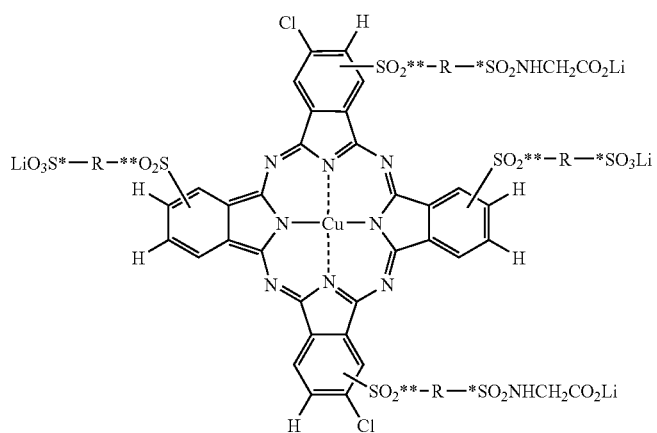
| | Compound No. |
|---|---|
| **—R—* = **—CH$_2$CH$_2$CH$_2$—* | 163 |
| **—CH$_2$CH$_2$CH$_2$CH$_2$—* | 164 |
| **—CH$_2$CH$_2$CH$_2$CH$_2$CH$_2$—* | 165 |
| 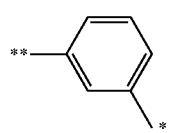 | 166 |
|  | 167 |

-continued
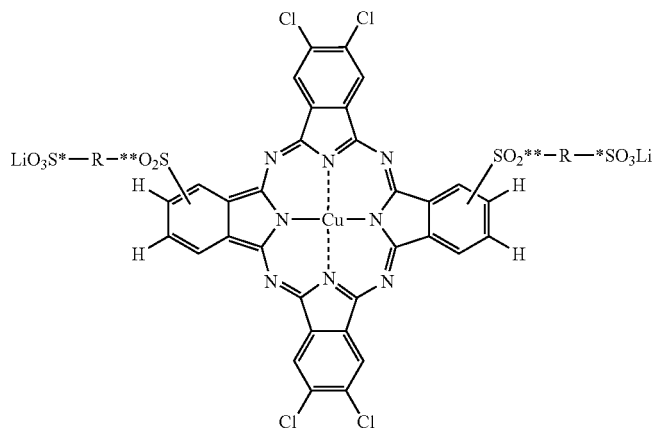
| | Compound No. |
|---|---|
| \*\*—R—\* = \*\*—CH$_2$CH$_2$CH$_2$—\* | 168 |
| \*\*—CH$_2$CH$_2$CH$_2$CH$_2$—\* | 169 |
| \*\*—CH$_2$CH$_2$CH$_2$CH$_2$CH$_2$—\* | 170 |
| 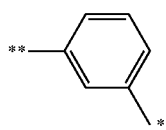 | 171 |
|  | 172 |
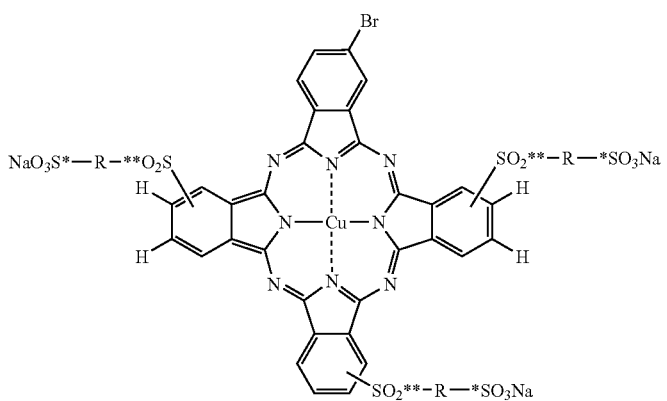
| | Compound No. |
|---|---|
| \*\*—R—\* = \*\*—CH$_2$CH$_2$CH$_2$—\* | 173 |
| \*\*—CH$_2$CH$_2$CH$_2$CH$_2$—\* | 174 |
| \*\*—CH$_2$CH$_2$CH$_2$CH$_2$CH$_2$—\* | 175 |

-continued
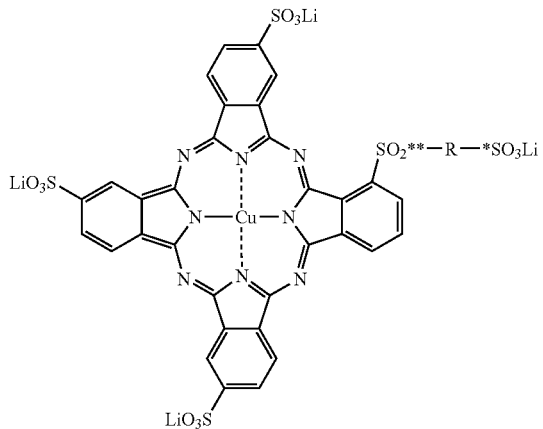
| **—R—* = | Compound No. |
|---|---|
| **—CH$_2$CH$_2$CH$_2$—* | 176 |
| **—CH$_2$CH$_2$CH$_2$CH$_2$—* | 177 |
| **—CH$_2$CH$_2$CH$_2$CH$_2$CH$_2$—* | 178 |
|  | 179 |
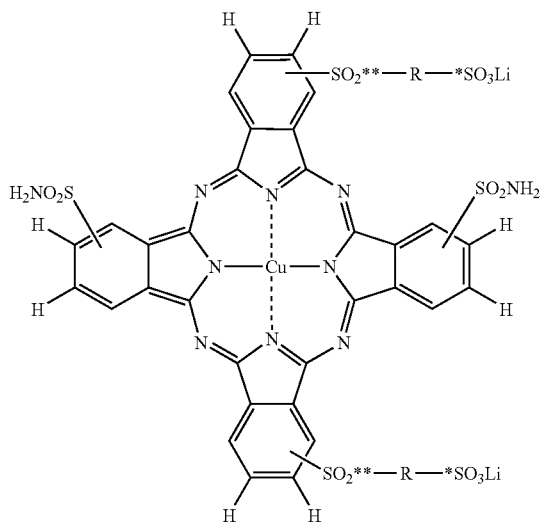
| **—R—* = | | Compound No. |
|---|---|---|
| **—CH$_2$CH$_2$—* | | 180 |
| **—CH$_2$CH$_2$CH$_2$—* | | 181 |
| **—CH$_2$CH$_2$CH$_2$CH$_2$—* | | 182 |
| **—CH$_2$CH$_2$CH$_2$CH$_2$CH$_2$—* | | 183 |
| **—CH$_2$CH$_2$—(OCH$_2$CH$_2$)n—* | | |
| | n = 1 | 185 |
| | 2 | 186 |
| | 3 | 187 |

EXAMPLES

Synthetic Example 1

Synthesis of Illustrated Compound No. 2

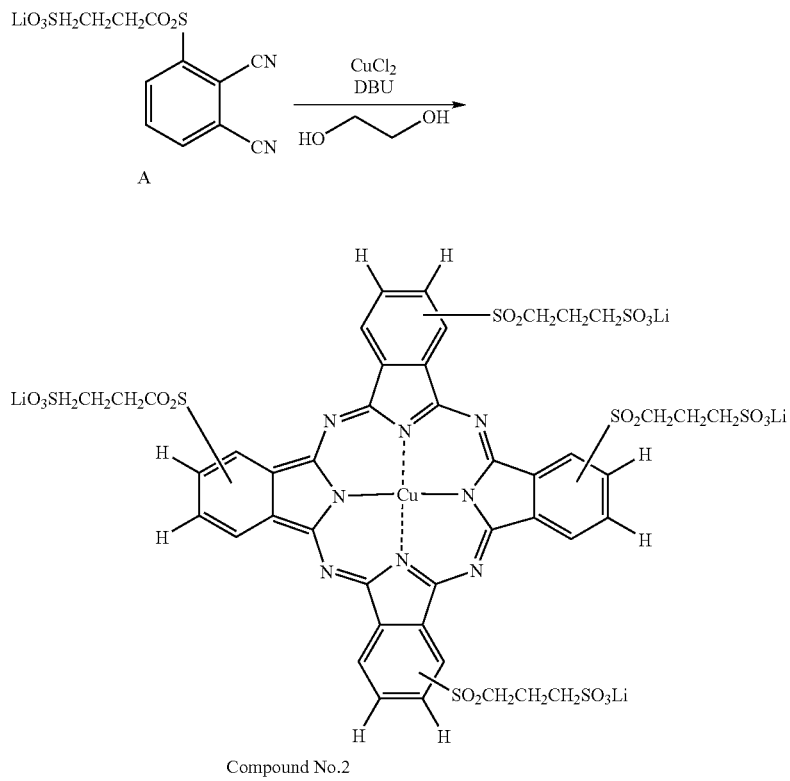

Compound No.2

CuCl$_2$ (134 mg, 1 mmol) was added to a synthetic intermediate A (1.26 g, 4 mmol) in an ethylene glycol solution (10 mL), and this was heated to 100° C. DBU (1.52 g, 10 mmol) was aded to the reaction mixture, and stirring was carried out for 10 hours at 100° C. The reaction mixture was acidified with hydrochloric acid, and LiCl was added thereto to separate a crude phthalocyanine. The obtained crude product was purified through column chromatography using Sephadex G-15 as a carrier. 67 mg of a mixture of illustrated compound No. 2 was obtained (yield of 5%).

Synthetic Example 2

Synthesis of Illustrated Compound No. 3

Synthesis of illustrated compound No. 3 was conducted according to a similar operation to that in the synthetic example 1, except that synthetic intermediate B was used instead of synthetic intermediate A.

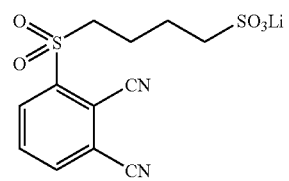

B

Synthetic Example 3

Synthesis of Illustrated Compound No. 29

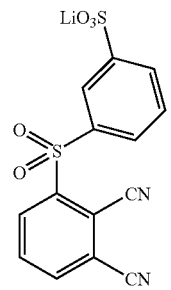

C

Illustrated compound No. 29 was obtained by conducting a similar operation to that in the synthesis of illustrated compound No. 2, except that intermediate C was used instead of intermediate A.
Synthetic Example 4
Synthesis of Illustrated Compound No. 61
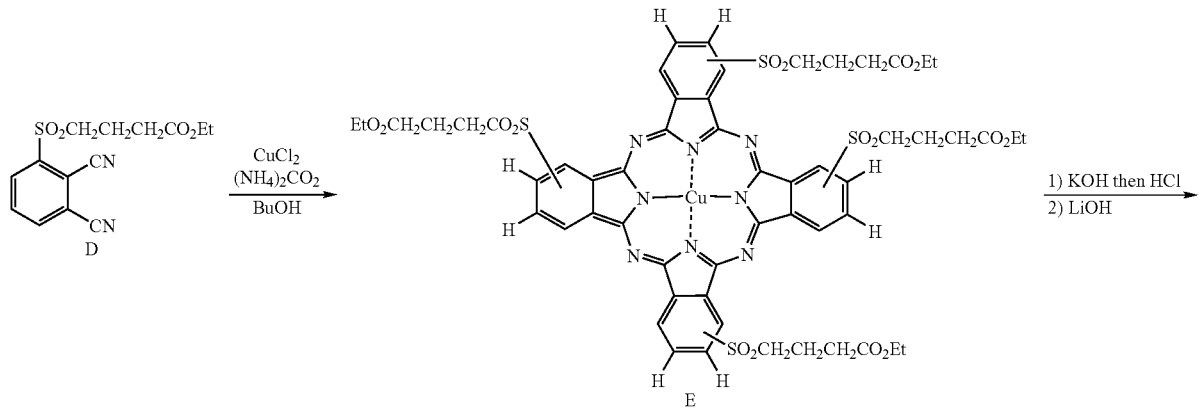
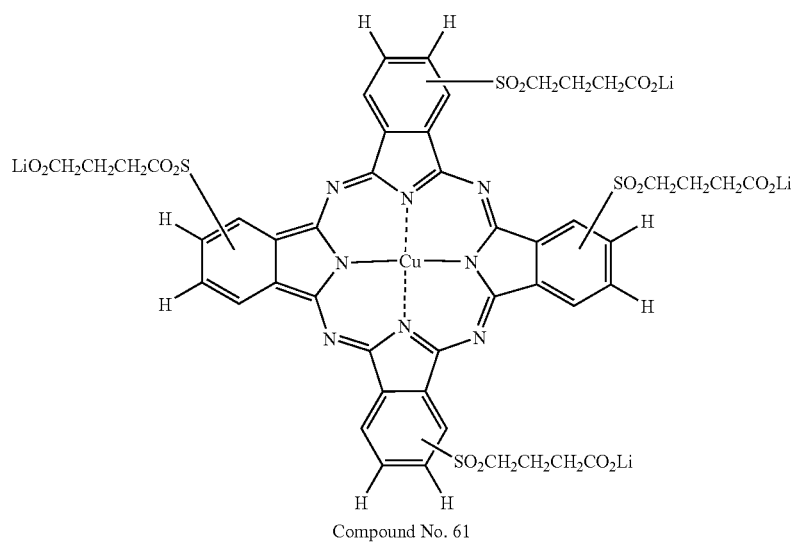
Compound No. 61

A butanol solution of synthetic intermediate D (6.36 g, 20 mmol) and ammonium carbonate (3.85 g, 40 mmol) was stirred at 90° C., CuCl$_2$ (0.67 g, 5 mmol) was added to this solution, and the mixture was further stirred for 5 hours at 100° C. The reaction mixture was concentrated and dried up, and the obtained solid was washed with diluted hydrochloric acid. The obtained crude product was purified through silica-gel column chromatography, and intermediate E was obtained (1.9 g, yield 30%). Intermediate C (2.5 g, 1.9 mmol) was added to a methanol solution (50 mL) of KOH (10 g), and this was stirred for 2 hours at 50° C. and acidified with hydrochloric acid after an addition of water (250 mL). The separated solid was filtrated, washed, and then dissolved in an aqueous solution of LiOH and concentrated and dried up to obtain a solid. The obtained solid was washed with isopropanol and dried to obtain the illustrated compound No. 61 (0.9 g, yield of 15% from intermediate C).

Synthetic Example 5

Synthesis of Illustrated Compound No. 72

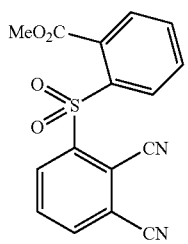

F

Illustrated compound No. 72 was obtained by conducting a similar operation to that in the synthesis of illustrated compound No. 61, except that intermediate F was used instead of intermediate D.

Synthesis Example 6

Synthesis of Illustrated Compound No. 73

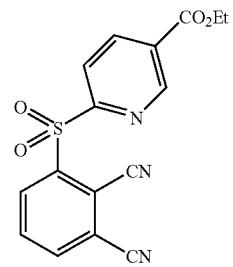

G

Illustrated compound No. 73 was obtained by conducting a similar operation to that in the synthesis of illustrated compound No. 61, except that intermediate G was used instead of intermediate D.

In above synthetic examples 1 to 6, the counter cation can be changed by changing the reactant to NaOH or ammonia from LiOH or using an ion-exchange method, and each corresponding Na form or NH$_4$ form can be synthesized.

<Measurement of Spectral Light Absorption Spectrum>

λ max and a half band width of the absorption thereof are shown below for the phthalocyanine compounds of the present invention provided by the above synthetic examples and comparative compounds.

Measurement condition: measurement of an absorbance of a solution obtained by dissolving 5 mg of the sample in 100 mL of water.

Half band width=(absorbance at λ max−absorbance at 460 nm)/2

TABLE 1

| Compound | λ max (nm) | Half Band Width | Note |
| --- | --- | --- | --- |
| Comparative Compound A | 629 | 90 | Comparative |
| Comparative Compound B | —* | —* | Comparative |
| Compound No. 2 | 656 | 24 | Invention |
| Compound No. 3 | 658 | 25 | Invention |
| Compound No. 61 | 656 | 25 | Invention |
| Compound No. 29 | 672 | 35 | Invention |
| Compound No. 72 | 675 | 32 | Invention |
| Compound No. 73 | 670 | 38 | Invention | note:

*unable to be measured because the compound is insoluble.

Comparative compound A: compound No. 101 described in JP-A No. 2004-323511.

Comparative compound B: compound No. I-40 described in JP-A No. 2003-94828.

TABLE 1-continued
| Compound | λ max (nm) | Half Band Width | Note |
|---|---|---|---|
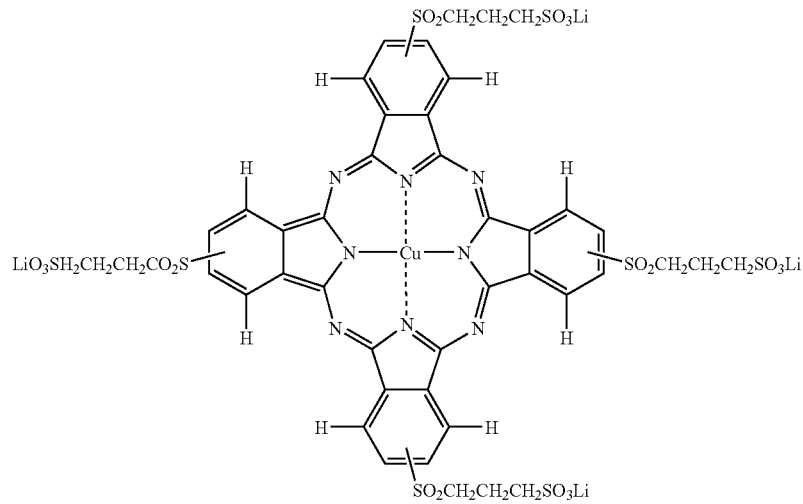
Comparative Compound A
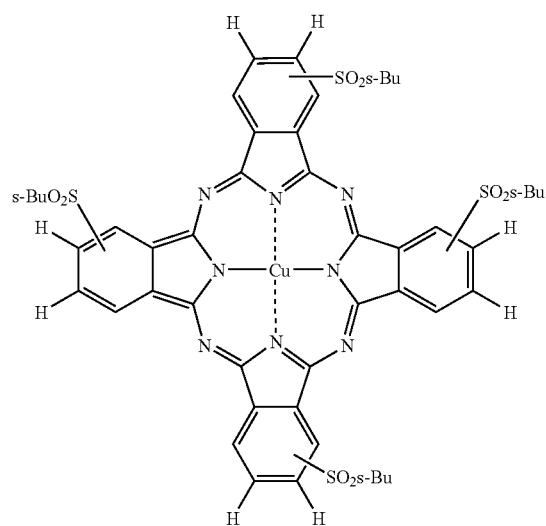
Comparative Compound B The α-sulfonyl group substituted phthalocyanine compounds according to the present invention are all water-soluble dyes and show a sharp spectral light absorption spectrum derived from the monomer in an aqueous solution. The conventionally known oil-soluble α-sulfonyl group substituted phthalocyanine compound can not be used as an aqueous solution because of its low solubility to water. On the other hand, concerning the water-soluble β-sulfonyl group substituted phthalocyanine compound, only a broad spectral light absorption spectrum derived from aggregates was obtained.

What is claimed is:

1. A phthalocyanine compound represented by the following formula (PC-1):

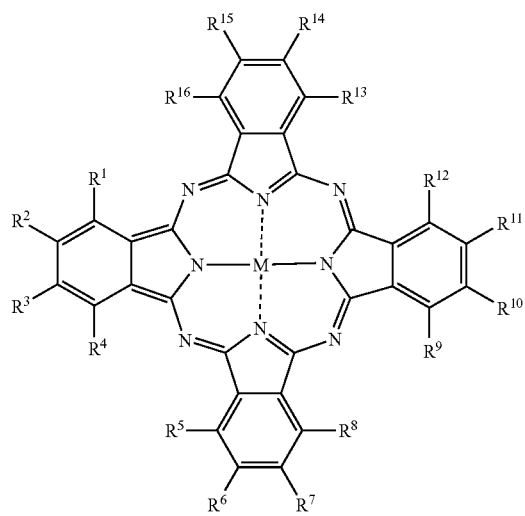

Formula (PC-1)

wherein, M represents a hydrogen atom or a metal atom; $R^1$, $R^4$, $R^5$, $R^8$, $R^9$, $R^{12}$, $R^{13}$, and $R^{16}$ each independently represent a hydrogen atom or a group represented by formula (II); at least one of $R^1$, $R^4$, $R^5$, $R^8$, $R^9$, $R^{12}$, $R^{13}$, and $R^{16}$ represents a group represented by formula (II); and $R^2$, $R^3$, $R^6$, $R^7$, $R^{10}$, $R^{11}$, $R^{14}$, and $R^{15}$ each independently represent a hydrogen atom, a halogen atom, or a sulfo group;

—SO$_2$R$^{17}$      Formula (II)

wherein, $R^{17}$ represents an alkyl group having a hydrophilic group, an aryl group having a hydrophilic group, or a heterocyclic group having a hydrophilic group.

2. The phthalocyanine compound according to claim 1, wherein the hydrophilic group of $R^{17}$ is one selected from a sulfo group, a carboxy group, or a phosphate group.

3. The phthalocyanine compound according to claim 2, wherein the hydrophilic group of $R^{17}$ is a sulfo group or a carboxy group.

4. The phthalocyanine compound according to claim 3, wherein the hydrophilic group of $R^{17}$ is a sulfo group.

5. A phthalocyanine compound represented by the following formula (PC-1):

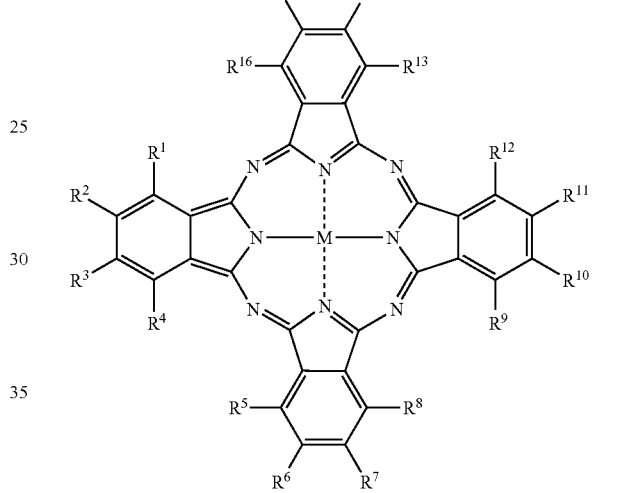

Formula (PC-1)

wherein M represents a hydrogen atom or a metal atom; $R^1$, $R^4$, $R^5$, $R^8$, $R^9$, $R^{12}$, $R^{13}$, and $R^{16}$ each independently represent a hydrogen atom or a group represented by formula (II); at least one of $R^1$, $R^4$, $R^5$, $R^8$, $R^9$, $R^{12}$, $R^{13}$, and $R^{16}$ represents a group represented by formula (II); and $R^2$, $R^3$, $R^6$, $R^7$, $R^{10}$, $R^{11}$, $R^{14}$, and $R^{15}$ each independently represent a hydrogen atom, a halogen atom, or a sulfo group;

—SO$_2$R$^{17}$      Formula (II)

wherein, $R^{17}$ represents an alkyl group having a hydrophilic group.

6. The phthalocyanine compound according to claim 5, wherein the hydrophilic group of $R^{17}$ is one selected from a sulfo group, a carboxy group, or a phosphate group.

7. The phthalocyanine compound according to claim 6, wherein the hydrophilic group of $R^{17}$ is a sulfo group or a carboxy group.

8. The phthalocyanine compound according to claim 7, wherein the hydrophilic group of $R^{17}$ is a sulfo group.

9. A phthalocyanine compound represented by the following formula (PC-1):

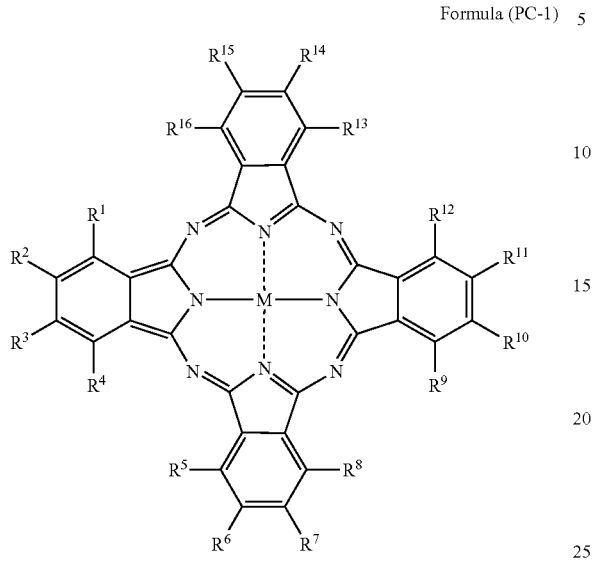

Formula (PC-1)

wherein M represents a hydrogen atom or a metal atom; $R^1$, $R^4$, $R^5$, $R^8$, $R^9$, $R^{12}$, $R^{13}$, and $R^{16}$ each independently represent a atom or a group represented by formula (II); four from among $R^1$, $R^4$, $R^5$, $R^8$, $R^9$, $R^{12}$, $R^{13}$, and $R^{16}$ are a group represented by formula (II); $R^2$, $R^3$, $R^6$, $R^7$, $R^{10}$, $R^{11}$, $R^{14}$, and $R^{15}$ each independently represent a hydrogen atom, a halogen atom, or a sulfo group;

—$SO_2R^{17}$    Formula (II)

and wherein $R^{17}$ represents an alkyl group having a hydrophilic group, an aryl group having a hydrophilic group, or a heterocyclic group having a hydrophilic group.

10. The phthalocyanine compound according to claim 9, wherein $R^1$ or $R^4$, $R^5$ or $R^8$, $R^9$ or $R^{12}$, and $R^{13}$ or $R^{16}$ are each a group represented by formula (II).

11. A phthalocyanine compound represented by the following formula (PC-1):

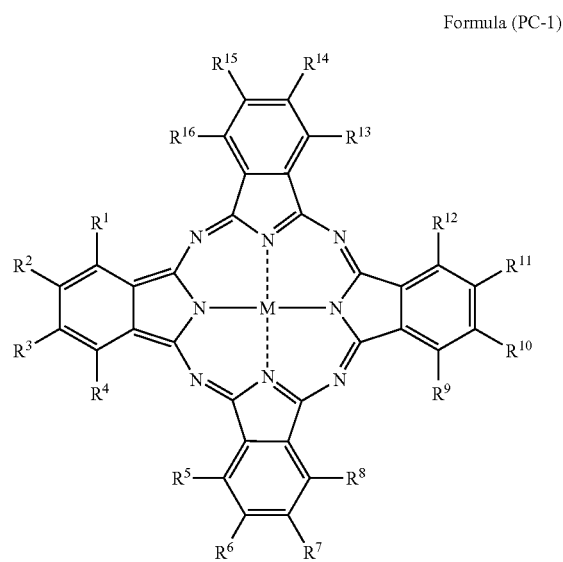

Formula (PC-1)

wherein $R^1$, $R^4$, $R^5$, $R^8$, $R^9$, $R^{12}$, $R^{13}$, and $R^{16}$ each independently represent a hydrogen atom or a group represented by formula (II); at least one of $R^1$, $R^4$, $R^5$, $R^8$, $R^9$, $R^{12}$, $R^{13}$, and $R^{16}$ represents a group represented by formula (II); and $R^2$, $R^3$, $R^6$, $R^7$, $R^{10}$, $R^{11}$, $R^{14}$, and $R^{15}$ each independently represent a hydrogen atom, a halogen atom, or a sulfo group;

—$SO_2R^{17}$    Formula (II)

wherein $R^{17}$ represents an alkyl group having a hydrophilic group, an aryl group having a hydrophilic group, or a heterocyclic group having a hydrophilic group;

and wherein M is a copper atom.

12. A metal phthalocyanine compound represented by the following formula:

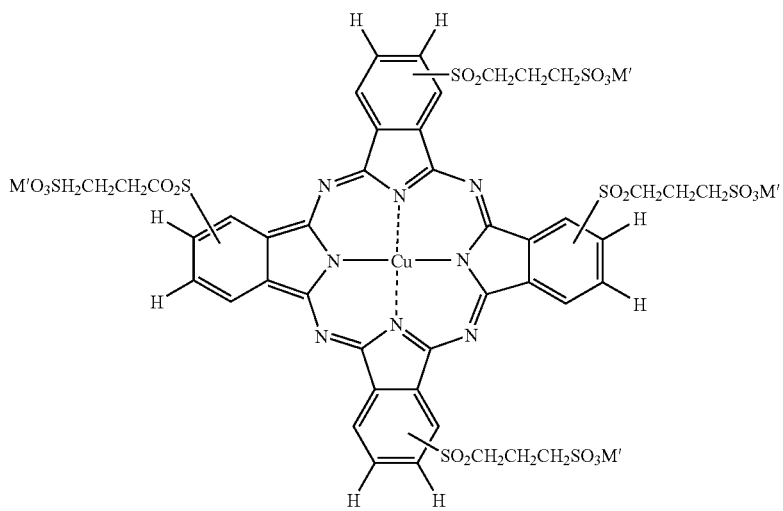

wherein M' independently represents one selected from Li, Na or NH$_4$.
13. A metal phthalocyanine compound represented by the following formula:
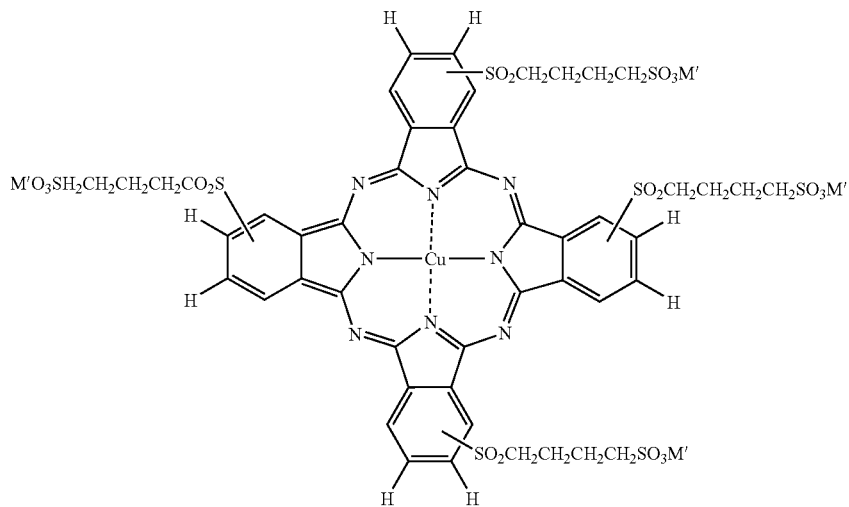
wherein M' independently represents one selected from Li, Na or NH$_4$.
14. A metal phthalocyanine compound represented by the following formula:
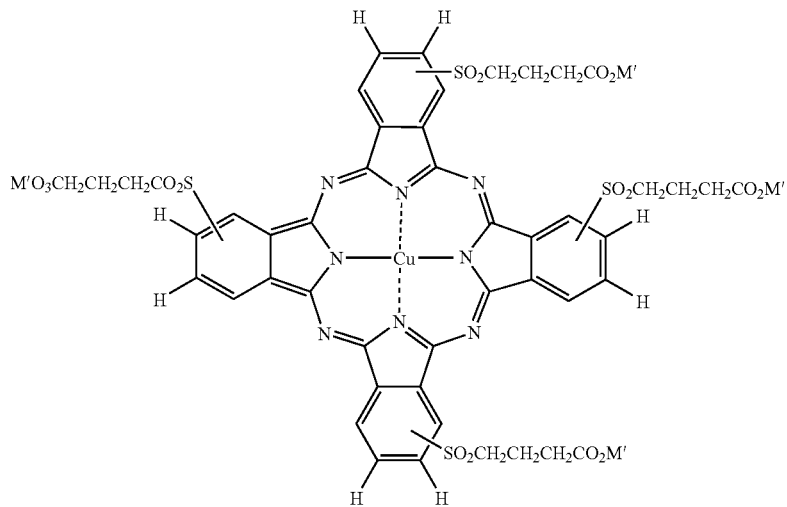

15. A metal phthalocyanine compound represented by the following formula:

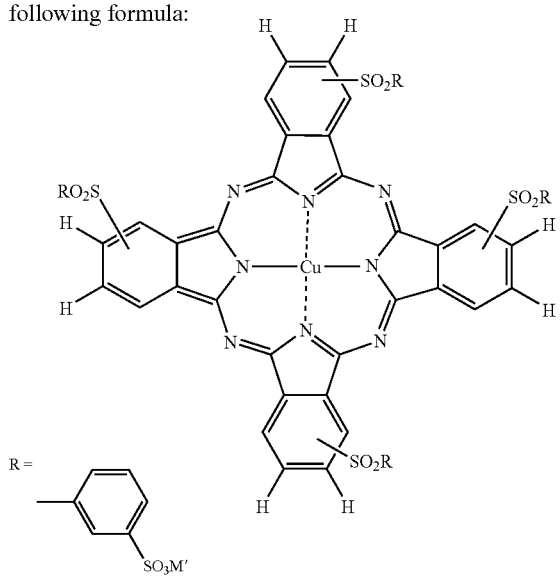

wherein M' independently represents one selected from Li, Na or NH$_4$.

16. A metal phthalocyanine compound represented by the following formula:

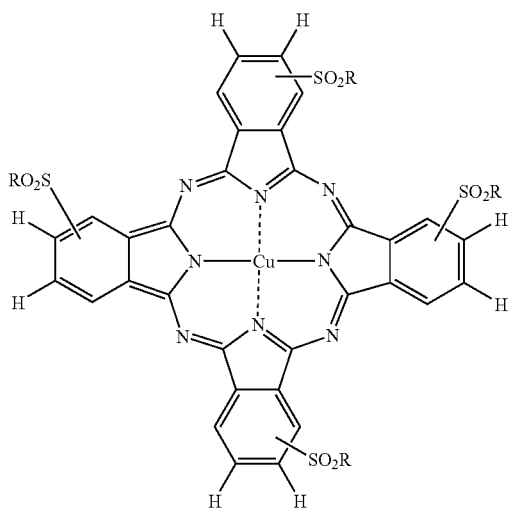

R = 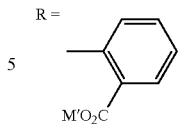

wherein M' independently represents one selected from Li, Na or NH$_4$.

17. A metal phthalocyanine compound represented by the following formula:

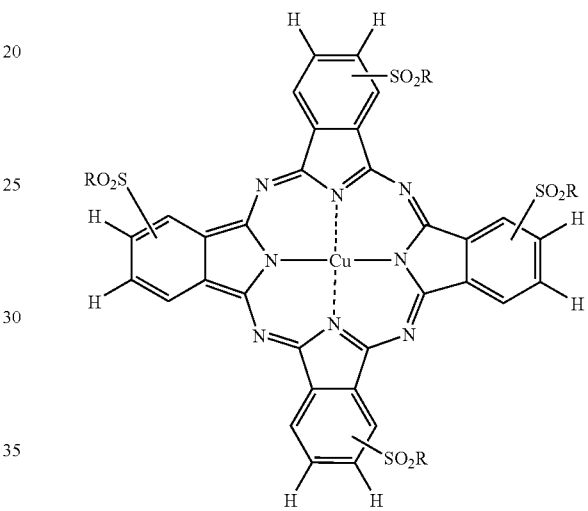

wherein M' independently represents one selected from Li, Na or NH$_4$.

* * * * *